United States Patent [19]
Nankaku et al.

[11] Patent Number: 5,014,209
[45] Date of Patent: May 7, 1991

[54] METHOD OF FORMING CONFIGURATION DATA FOR CNC MACHINING APPARATUS

[75] Inventors: Shigeki Nankaku; Shigeru Koikawa, both of Aichi, Japan

[73] Assignee: Mitsubishi Denki Kabushiki Kaisha, Tokyo, Japan

[21] Appl. No.: 252,213

[22] Filed: Oct. 3, 1988

[30] Foreign Application Priority Data

Oct. 2, 1987 [JP] Japan ................................. 62-249222
Oct. 2, 1987 [JP] Japan ................................. 62-249223

[51] Int. Cl.⁵ ............................................ G05B 19/403
[52] U.S. Cl. .............................. 364/474.35; 318/572; 364/474.18
[58] Field of Search .................. 364/474.02, 474.16, 364/474.17, 474.18, 474.35; 318/572, 569, 570

[56] References Cited

U.S. PATENT DOCUMENTS

| | | | |
|---|---|---|---|
| 4,445,182 | 4/1984 | Morita et al. | 364/474.18 X |
| 4,533,286 | 8/1985 | Kishi et al. | 364/474.18 X |
| 4,559,601 | 12/1985 | Kishi et al. | 364/474.18 X |
| 4,572,998 | 2/1986 | Nozawa et al. | 364/474.18 X |
| 4,659,265 | 4/1987 | Kishi et al. | 364/474.18 X |
| 4,713,747 | 12/1987 | Niwa | 364/474.16 X |

FOREIGN PATENT DOCUMENTS

| | | |
|---|---|---|
| 0104542 | 4/1984 | European Pat. Off. |
| 0113682 | 7/1984 | European Pat. Off. |
| 2466798 | 4/1981 | France |

OTHER PUBLICATIONS

European Search Report #88116169.9 Dated 3/89.

*Primary Examiner*—Joseph Ruggiero
*Attorney, Agent, or Firm*—Sughrue, Mion, Zinn, Macpeak & Seas

[57] ABSTRACT

A method of forming configuration data for a CNC machine tool having a CNC (computerized numerical control unit) comprising a CPU (central processing unit), a memory, input/output means, and servo drive means. According to final configuration data train inputted for a workpiece, an edge-corrected configuration data block train is formed with the edge configuration of a cutting tool taken into accound, and configuration data are formed for a remainder which is created in said workpiece because of the edge configuration correction, so that the workpiece is automatically machined.

6 Claims, 10 Drawing Sheets

METHOD OF FORMING CONFIGURATION DATA FOR CNC MACHINING APPARATUS

BACKGROUND OF THE INVENTION

This invention relates to a method of automatically forming configuration data for a remainder (described later) which is created in the workpiece because of the edge configuration of the cutting machining tool in a CNC (Computer Numerical Control) machining apparatus.

One example of a machine tool using a CNC unit is a conventional CNC lathe. The CNC lathe receives data on the finally machined configuration (hereinafter referred to as "a final configuration", when applicable) of a work piece to be machined and data on the edge configuration of a cutting tool, to automatically form a machining path for the cutting tool, thereby to machine the workpiece.

Figure 1:
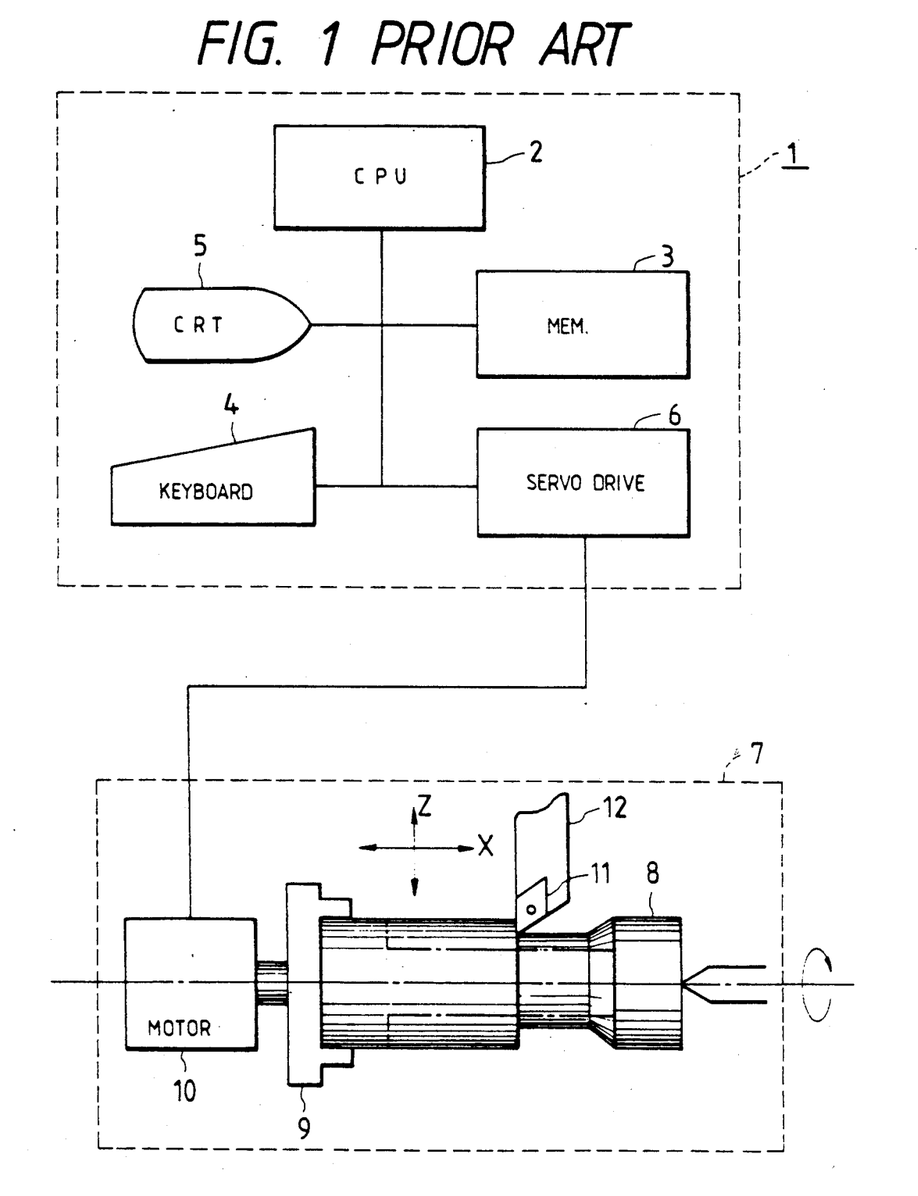
FIG. 1 is an explanatory diagram showing the hardware of a conventional CNC lathe to which the technical concept of the invention is applied.

FIG. 1 is an explanatory diagram showing the arrangement of the conventional CNC lathe. In FIG. 1, reference numeral 1 designates a CNC. The CNC comprises; a CPU (central processing unit) 2; a memory 3 in which control programs and machining programs have been stored; a keyboard forming input/output means; a CRT (cathode ray tube) 5; and servo drive means including an axial movement control section and a servo amplifier. Further in FIG. 1, reference numeral 7 designates a lathe under the control of the CNC. The lathe comprises: a chuck 9 for holding a work piece 8; a spindle motor for rotating the work piece 8 through the chuck 9; a cutting tool 11 for machining the work piece 8; a tool holder 12 for holding the cutting tool 11; and two servo motors (not shown) which, under the control of the above-described servo drive means 6, move the cutting tool 11 in the direction of the axis of rotation of the work piece 8; i.e., in the direction of X-axis, and in the direction perpendicular to the direction of X-axis; i.e., in the direction of Z-axis through the tool holder 12, respectively.

The operation of the CNC lathe thus organized will be described.

Figure 2:
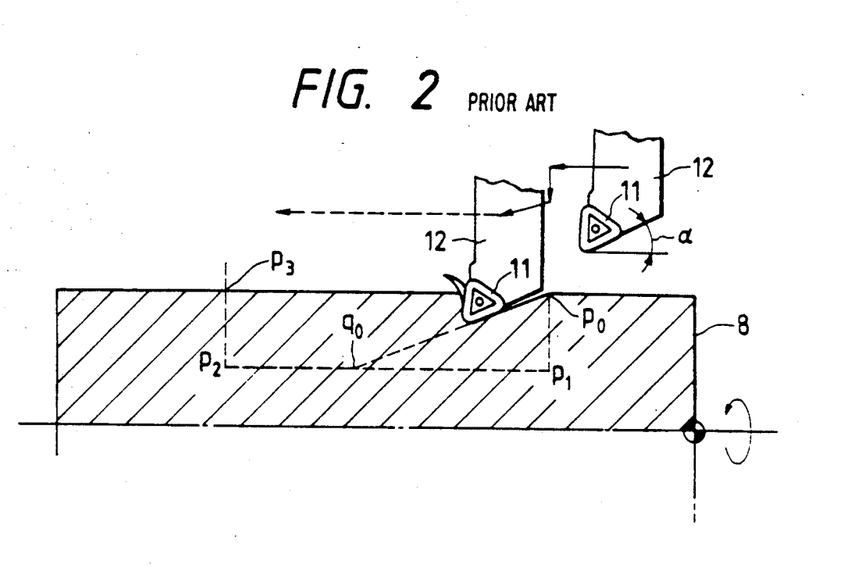
FIG. 2 is an explanatory diagram for a description of the creation of a remainder in the workpiece.

The CPU 2 accesses a control program stored in the memory 3 and processes the commands one by one. Furthermore the CPU 2 accesses a machining program stored in the memory 3 according to the control program, and, according to the machining program, calculates the distance of movement of the cutting tool 11 in the X-Z coordinate plane and applies the distance of movement thus calculated to the servo drive means 6, and pulse-controls the two servo motors (not shown) of the lathe 7 with the aid of the servo drive means 6, to machine the work-piece 8. That is, according to the final configuration data of the workpiece 8 and the edge configuration data of the cutting tool 11 which have been inputted through the keyboard 4 according to the machining program mentioned above, the workpiece 8 is machined to the edge-corrected configuration which is determined by taking the tool angle into account. For instance, as shown in FIG. 2, a train of final configuration data blocks $p_0$ through $P_3$ are inputted, with which the final configuration section of a cylindrical workpiece 8 (taken along the central axis) is defined by connecting the points $p_0$, $p_1$, $p_2$ and $p_3$. Then a train of edge-corrected configuration data blocks $p_0$, $q_0$, $p_2$ and $p_3$, with which, similarly, the section is defined by connecting the points $p_0$, $q_0$, $p_2$ and $p_3$, are formed in the memory 3. According to the train of edge correct configuration data blocks thus formed, a machining path is automatically formed for the cutting tool 11, so that the workpiece 8 is machined.

Figure 3:
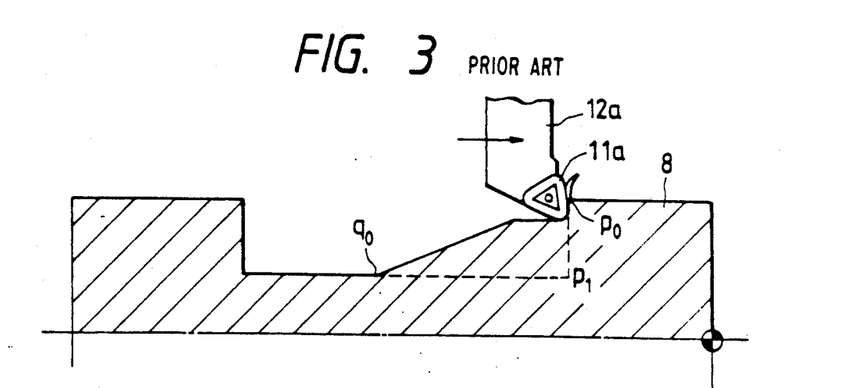
FIG. 3 is an explanatory diagram for a description of the removal of the remainder.

However, in this operation, as is apparent from the above-described final configuration an annular portion $p_0$-$p_1$-$q_0$ triangular in section remains unmachined (hereinafter referred to as "a remainder", when applicable). Therefore, the configuration data of the remainder are obtained, for instance, by calculation, and inputted through the keyboard 4 in advance, and as shown in FIG. 3 a cutting tool 11a whose edge is orientated opposite to the edge of the cutting tool used for the machining of the edge-corrected configuration is moved in the opposite direction so that the remainder of the workpiece 8 is machined.

In a CNC machine tool such as the above-described conventional CNC lathe, in order to remove the remainder which is formed because of the configuration of the edge of the cutting tool 11, it is necessary to form the configuration data of the remainder separately and to input them in advance. This is considerably troublesome in the operation.

SUMMARY OF THE INVENTION

Accordingly, an object of this invention is to eliminate the above-described difficulty. More specifically, an object of this invention is to provide a method of automatically forming the configuration data of a remainder which is due to the edge correction of a cutting tool in a CNC machining apparatus. According to the invention, a CNC machining apparatus comprises a CNC, a memory, input/output means, and servo drive means is provided, and according to final configuration data inputted for a workpiece, an edge-corrected configuration data block train is formed with the edge configuration of a cutting tool taken into account, and configuration data are formed for a remainder which is created in the workpiece because of the edge configuration of the cutting tool.

Further in a method of forming configuration data for a CNC machine tool, according to the invention, when a correction data block for a correction object is formed and added to the edge-corrected configuration block train, a storage data block for storing the final configuration data corresponding to the correction object, and a conversion table for searching for the address of the storage data block with the aid of the index data of the correction data block are formed, and data of the correction data block for the correction object in the edge-corrected configuration data block and of the storage data block corresponding to the correction data obtained through the conversion table are extracted to form configuration data for a remainder which is created in the workpiece because of the edge configuration of the cutting tool.

DETAILED DESCRIPTION OF THE PREFERRED EMBODIMENT

In a first embodiment of the invention, the CPU searches the final configuration data block train for a correction object for the cutting tool, and when a correction object is detected, a correction data block is formed and added to the edge-corrected configuration data block train while a storage data block is formed to store the final configuration data corresponding to the correction object, and a conversion table is formed so that the address of the storage data block can be searched with the aid of the index data of the correction data block; and when no correction object is detected, the final configuration data are transferred to complete the edge-corrected configuration data block train. Then, the CPU searches the edge-corrected configuration data block train for a correction object, and when a correction object is detected, then correction data are extracted from the corresponding correction data block while the final configuration data are extracted from the storage data block corresponding to the correction object which is obtained through the conversion table, and configuration data are formed for the remainder of the workpiece by utilizing these data thus extracted.

In a second embodiment of the present invention, the final configuration data train is checked for a cutting tool's edge correction object, and when no cutting tool's edge correction object is detected, the final configuration data checked are transferred to the edge-corrected configuration data train; and when a cutting tool's edge correction object is detected, correction data are formed and instead of the final configuration data checked, are transferred to the edge-corrected correction data train, and in formation of the correction data, two data in the final configuration data train which give the data of the start and end points of the correction, the final configuration data existing between the two data, and the correction data are transferred to the remainder data train.

Next, access is made to the remainder train successively, to form configuration data for the remainder created in the workpiece.

One preferred embodiment of this invention will be described with reference to FIGS. 4 through 9. In the embodiment, a CNC lathe is the same as that shown in FIG. 1, and in the following description reference numerals or characters which are the same as those in FIG. 1 designate the same parts.

Figure 4:
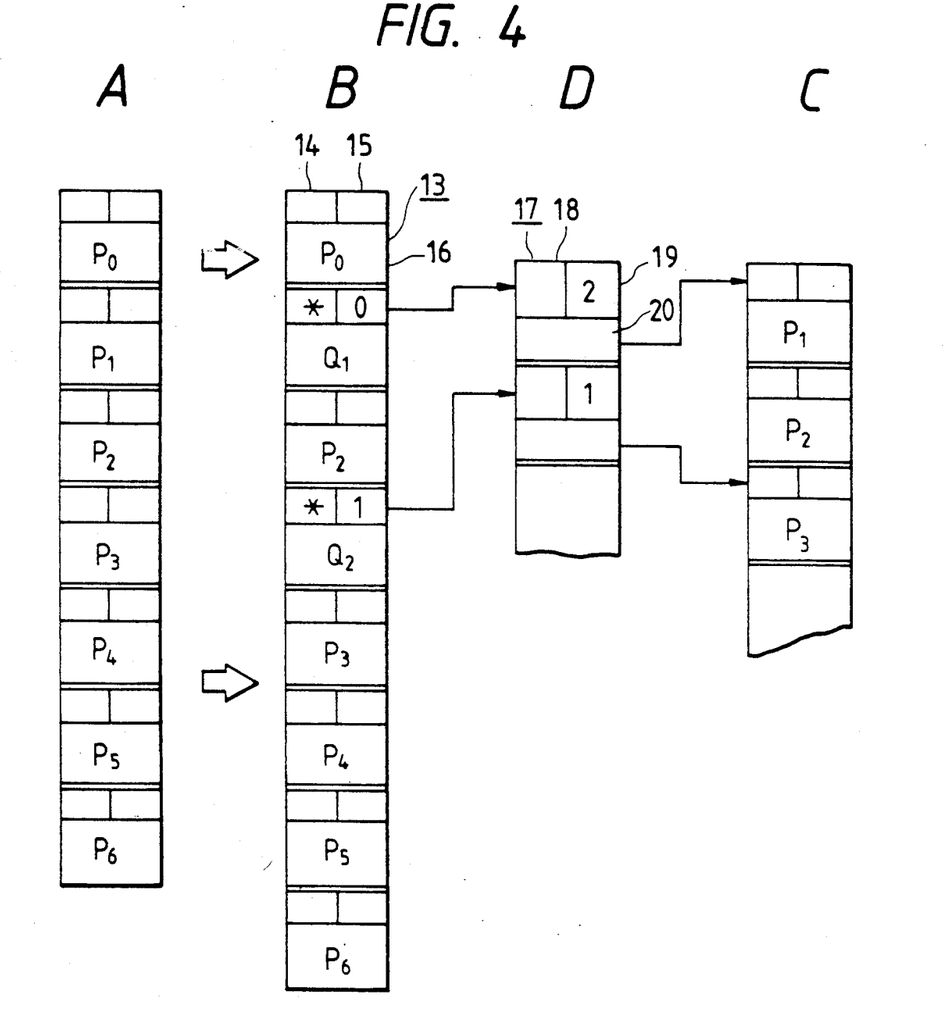
FIG. 4 is an explanatory diagram showing the relationships among an edge-corrected configuration data block train, storage data block train and conversion table train which are necessary for formation of remainder configuration data in one embodiment of this invention.
Figure 5A:
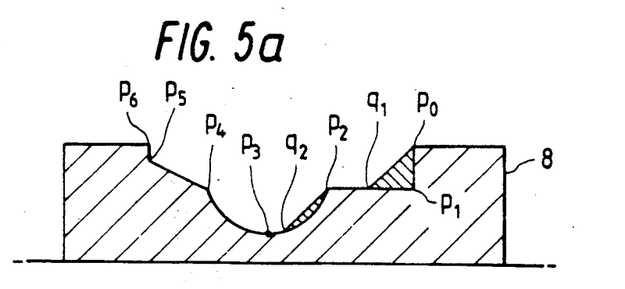
FIG. 5A, 5B and 5C comprise an explanatory diagram showing a section and external appearances of a workpiece.

FIG. 4 is an explanatory diagram showing machining data block trains for the workpiece 8 on which the configuration data of the remainder of the workpiece 8 are formed, in correspondence to FIG. 5A which is an explanatory diagram showing the machining section of the workpiece 8.

Figure 5B:
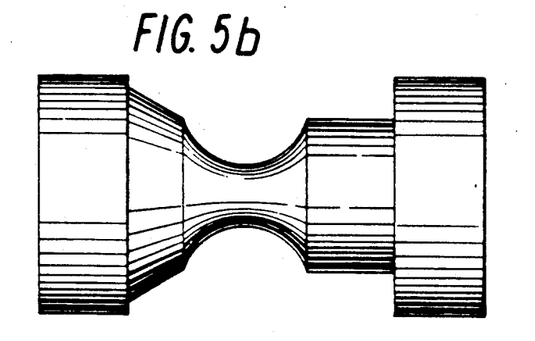
Figure 5C:
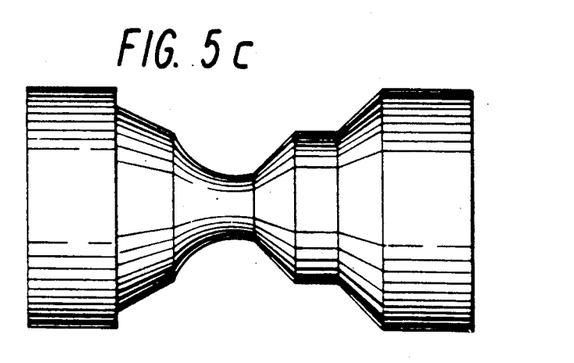

In FIG. 4, reference character A designates a final configuration data block train according to the final configuration data of the workpiece 8 which have been inputted through the keyboard 4 of the CNC 1. In the case where the final configuration of the workpiece 8 is as shown in FIG. 5B, the X-Z coordinates of points $p_0$ through $p_6$ in the section of the workpiece 8 as shown in the part a of FIG. 4 are stored in the data blocks $P_0$ through $P_6$, respectively, and configuration data (described later) between the points indicated by each of the blocks, except the first block $P_0$, and the respective preceding blocks are stored.

Further in FIG. 4, reference character B designates an edge-corrected configuration block train which is formed for actual machining by taking the edge configuration of the cutting tool 11 into account according to the above-described final configuration data block train A. The X-Z coordinates of points $p_0$, $q_1$, $p_2$, $q_2$, and $p_3$ through $p_6$ shown in FIG. 5A are stored in data blocks $P_0$, $Q_1$, $P_2$, $Q_2$ and $P_3$ through $P_6$, respectively, and configuration data between the points indicated by each of the blocks, except the first block, and the respective preceding blocks are stored. The blocks $Q_1$ and $Q_2$ are those which store correction data prepared for correction objects (hereinafter referred to as "correction data blocks", when applicable), and the blocks $P_0$ through $P_6$ are for other than the correction objects and are obtained by transferring the corresponding blocks of the above-described final configuration data block train A.

Further in FIG. 4, reference character C designates a storage data block train for storing out of the above-described final configuration data block train A the data blocks corresponding to the correction objects of the above-described edge-corrected configuration data block train B. More specifically, during the formation of the above-described edge-corrected configuration data block train B, data blocks $Q_1$ and $P_2$ are stored. For instance, the correction data block $Q_1$ for the correction object to replace the corresponding block $P_1$ of the final configuration data block train A which is not transferred to the edge-corrected configuration data block train B, and the block $P_2$ including the correction end point which is continuous with the block $P_1$, are stored.

Further in FIG. 4, reference character D designates a conversion table train for reading, in formation of the configuration data of the remainder of the workpiece 8, corresponding blocks of the above-described storage data block train C according to the index information (described later) of the correction data blocks for each correction object of the edge-corrected configuration data block train B.

The above-described final configuration data train A, edge correct configuration data block train B, storage data block train C, and conversion table train D are stored in the memory 3.

Figure 6A:
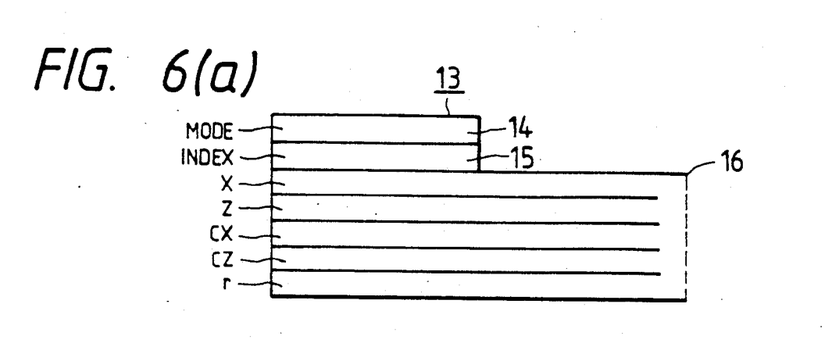
FIG. 6A and 6B comprise an explanatory diagram showing the structure of a data block.
Figure 6B:
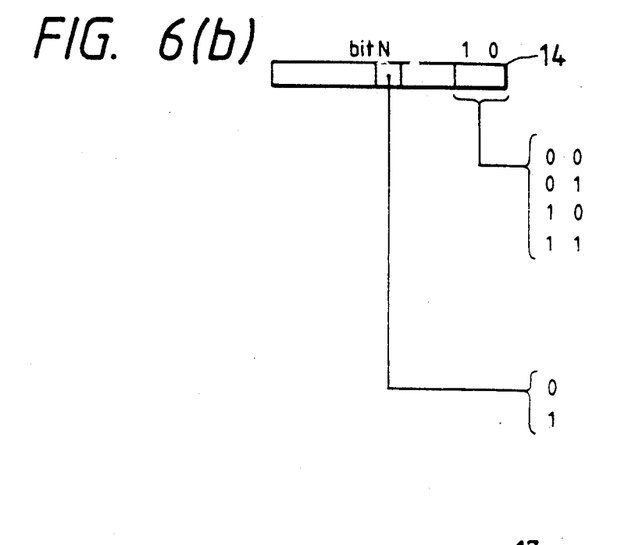
Figure 7:
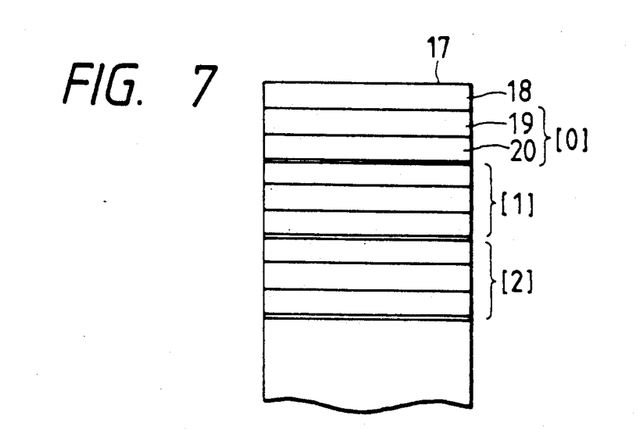
FIG. 7 is an explanatory diagram showing the structure of a conversion table.

FIG. 6A is an explanatory diagram showing the structure of an individual data block which is in common with the above-described data block trains A, B and C. As in FIG. 6A, the data block 13 comprises: a mode part 14; an index part 15; and a data storage part. The data storage part 16 stores the X-Z coordinates ($x_i$, $z_i$) of the point indicated by the block 13, and the configuration data of the line connecting the coordinate point ($x_i$, $z_i$) and the coordinate point ($x_{i-1}$, $z_{i-1}$) of the preceding block. For instance, in the case a straight line, the angle of inclination ($a_i$) and the intersect ($b_i$) are stored therein; and in the case of an arc, the center coordinates ($cx_i$, $cz_i$) and the radius ($r_i$) are stored. In the mode part 14, as shown in FIG. 6B the two least significant bits indicate the kind of configuration data stored in the data storage part 16. For instance, "0 1" indicates a straight line, "1 0" a clockwise (concave) arc, and "1 1" a counterclockwise (convex) arc. In the case where the two bits are "0 0", the block is the first one in the block train, and has no data. In the case of the edge-corrected configuration data block train B, a predetermined bit, or the n-th bit (for instance, the 3rd bit) is utilized as a flag bit. When the bit is "1" (ON), the data block is a correction data block. In the index part 15, in the case where, in the edge-corrected configuration data block train B, the data block is a correction data block; i.e., the n-th bit of the mode part 14 of the block is "1" (ON), the table numbers of the conversion table train D are stored in the order beginning from zero, and the corresponding conversion table can be called. FIG. 7 shows the arrangement of each of the tables in the conversion table train D. As shown in FIG. 7, a conversion table 17 is made up of a flag part 18, a number part 19, and a pointer 20. The pointer 20 stores the address of the corresponding block of the storage data block train C. The number of data blocks following the data block having the address specified by the pointer 20 is stored in the number part 19.

On the other hand, normally the final configuration data block train A is eliminated after the edge correct configuration data block train B is formed according to the train A, for the purpose of economically using the memory 2. Therefore, the data block, such as the data block $P_1$ of the final configuration data block train A, which is not transferred to the edge-corrected configuration data block train B because of the formation of the correction data block $Q_1$ should be stored separately for formation of the configuration data of the remainder. Furthermore, the blocks $P_2$ and $P_3$ following the correction data blocks $Q_1$ and $Q_2$ in the edge-corrected configuration data block train B should also be stored separately for formation of the configuration data of the remainder, because for formation of the configuration data of the remainder it is necessary to process the coordinates of these data blocks; i.e., it is necessary to coincide the coordinates of the blocks $P_2$ and $P_3$ with those of the preceding blocks $Q_1$ and $Q_2$.

Therefore, in the first step of forming the configuration data of the remainder, the data blocks corresponding to the correction objects in the final configuration data block train A which are not transferred to the edge-corrected configuration data block train B in the formation of the latter B—for instance, with respect to the first remainder, the block $P_1$ corresponding to the correction data block $Q_1$ and the block $P_2$ following the block $Q_1$, and with respect to the second remainder, the block $P_3$ following the correction data block $Q_2$—are stored with the storage data block train C formed separately, and with the conversion table train formed the addresses of the data blocks thus stored can be searched for through the index information of the data blocks $Q_1$ and $Q_2$. In the second step, for every correction object of the above-described edge-corrected configuration data block train B, as for the first remainder the correction data block $Q_1$, the preceding data block $P_0$, and the blocks $P_1$ and $P_2$ in the storage data block train C obtained through the conversion table are taken out to form the configuration data of the first remainder, and as for the second remainder the correction data block $Q_2$, the preceding block $P_2$, and the block $P_3$ in the storage data block train C are taken out to form the configuration data of the second remainder.

Figure 8:
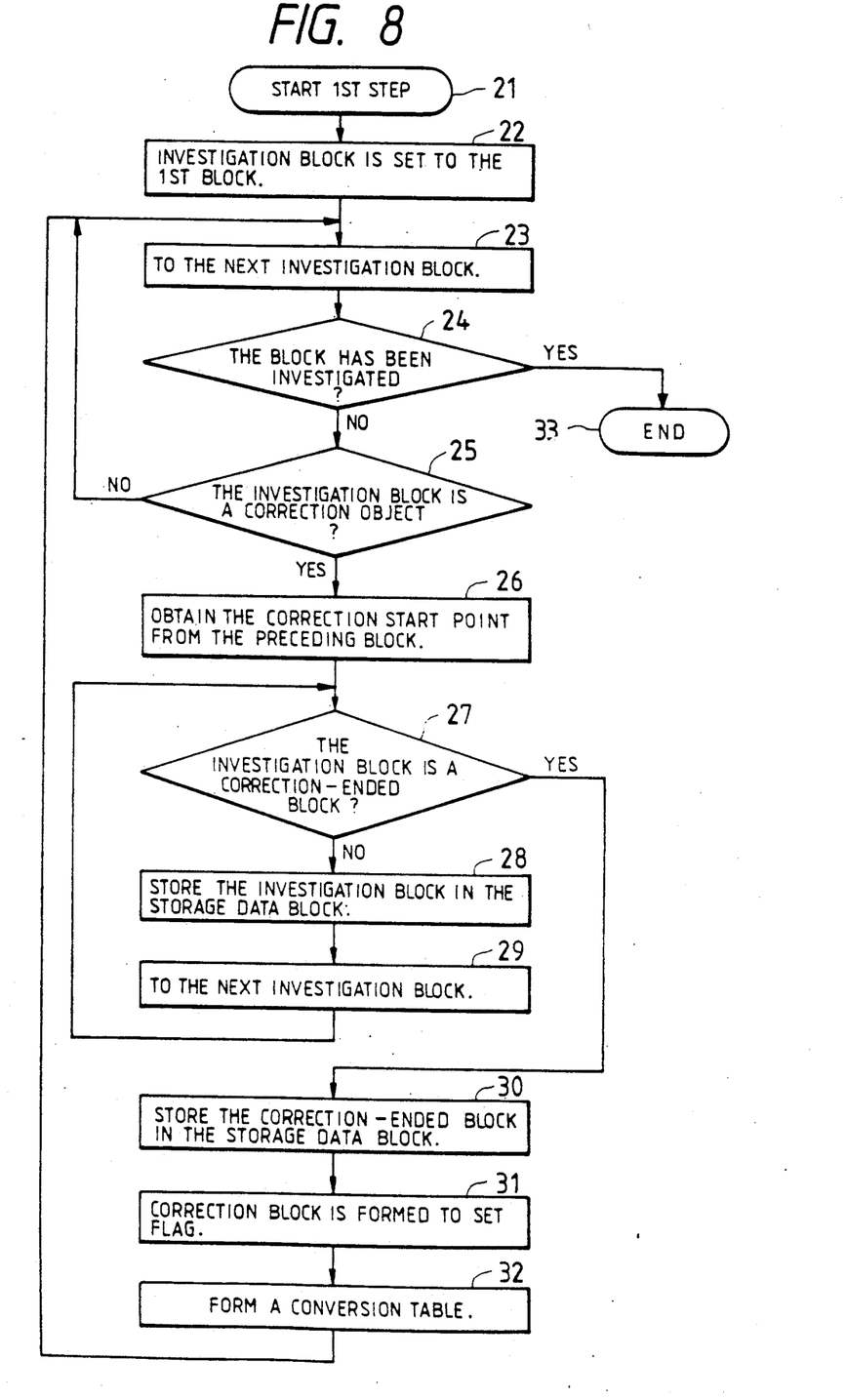
FIG. 8 is a flow chart showing the first step of forming remainder configuration data, in which an edge-corrected configuration data block, storage data block, and conversion table are formed.

FIG. 8 is a flow chart of the above-described first step. In formation of the edge-corrected configuration data block train B, the final configuration data block train A is searched for a correction object, and the correction block, and the storage data block C and the conversion table D are formed. In the flow chart, the term "investigation block" is intended to mean a block $P_n$ to be checked in the final configuration data block train A. In the start of the first step, the investigation block is set to the first block $P_0$ (Step 23), and then to the next block so that, in practice, the investigation is started with the block $P_1$ (Step 23). It is determined whether or not the block has been investigated (Step 24). If not, it is determined whether or not the investigation block is a correction object (Step 25). This determination is carried out by comparison of the gradient $a_n$ of a straight line connecting the coordinates $p_n$ ($x_n$, $z_n$) of the investigation block Pn and the coordinates $p_{n-1}$ ($x_{n-1}$, $z_{n-1}$) of the preceding block $P_{n-1}$ with the tool angle $\alpha$ of the cutting tool 11. When $\alpha < a_n$, it is determined that the investigation block is a correction object. When it is determined that the investigation block is not a correction block, then the investigation block, namely, the final configuration block is transferred to the edge-corrected configuration data block train B, and an edge-corrected configuration data block $P_n$ is formed, and then Step 23 is effected again. This step is not shown in the flow chart. When it is determined that the investigation block is a correction object, the coordinate data $p_0$ determining the correction start point is obtained from the preceding block $p_0$ ($=P_{n-1}$) (Step 26), and it is determined whether or not the investigation block is a correction-ended block (Step 27). If the investigation block is not the correction-ended block, then the investigation block is stored in a storage data block $P_1$ which is formed separately (Step 28), and the investigation block is set to the next block $P_2$, and Step 27 is effected again. It is determined again whether or not the investigation block is a correction-ended block. The block $P_2$ is a correction-ended block. Therefore, the block $P_2$ is stored in the storage data block $P_2$ which follows the storage data block $P_1$ formed previously (Step 30), and a correction data block $Q_1$ is formed. And the n-th bit in the mode part of the correction data block $Q_1$ is set to "1" (ON), thereby to set the flag (Step 31). In the edge-corrected configuration data block train B of FIG. 4, the flag set up is indicated by (*).

Next, a conversion table to search for the address of the above-described storage data block $P_1$ is formed by using the numerical value in the index part of the correction data block $Q_1$ (Step 32). The correction data block $Q_1$ is added to the above-described edge-corrected configuration data block train B, and Step 32 is effected again. This step is not shown. The above-described operations are carried out until the investigation block reaches the last stage. In Step 27, it is determined whether or not the investigation block is a correction-ended block; that is, it is determined whether the coordinate point of the position data included by the block is on one side of the straight line whose gradient is equal to the tool angle $\alpha$ of the cutting tool or the other side. When the coordinate point is on the left side of the straight line in FIG. 5A, it is determined that the investigation block is a correction-ended block.

Figure 9:
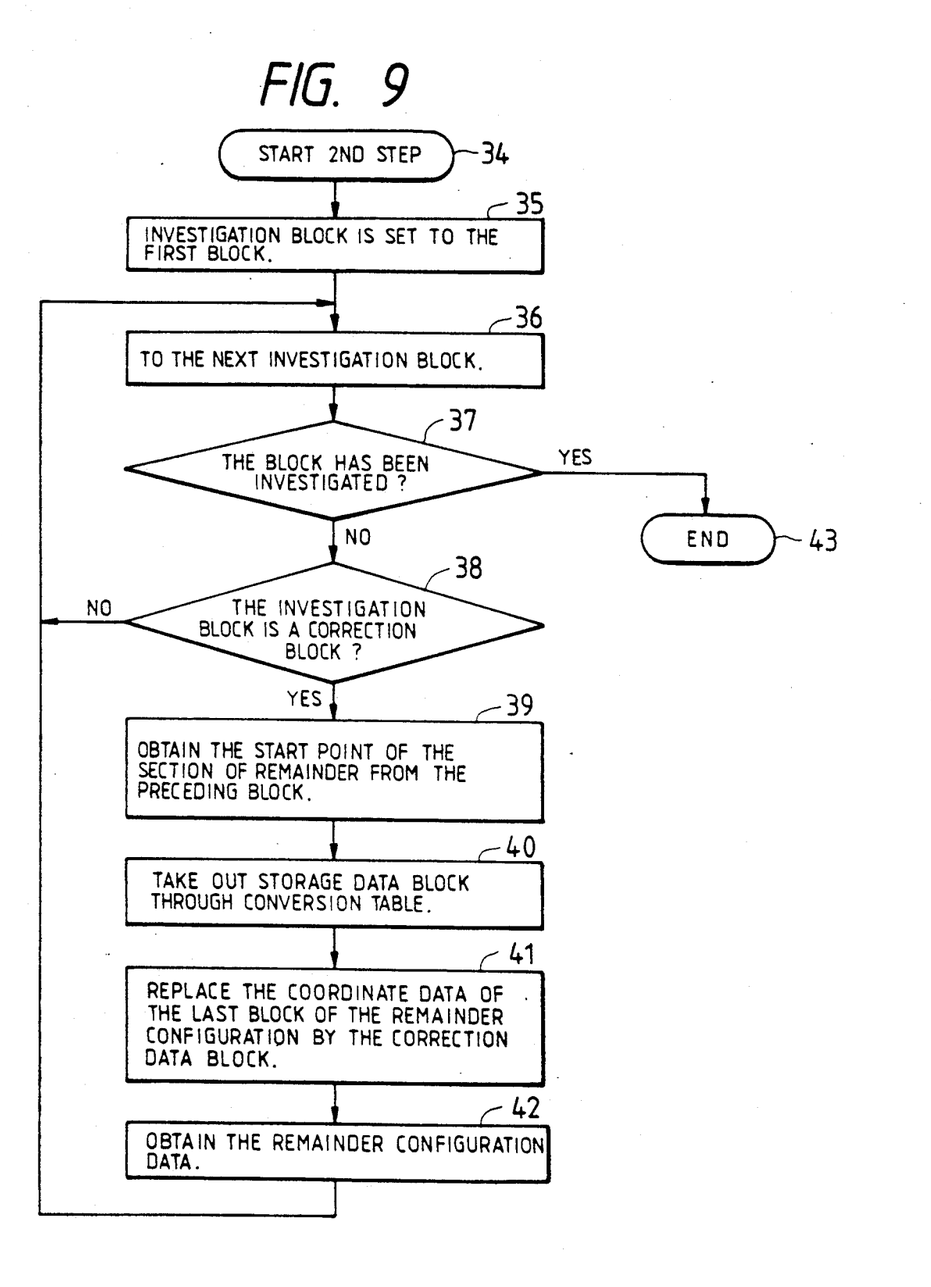
FIG. 9 is a flow chart showing the second step of forming the remainder configuration data, in which necessary data blocks are taken out, and remainder configuration data are formed.

FIG. 9 is a flow chart showing the second step described above. The edge-corrected configuration data block train B is successively searched so that the blocks $P_1$ and $P_2$ of the storage data block train C are taken out by using a correction data block, for instance the block $Q_1$, the preceding block $P_1$, and the index data of the block $Q_1$ with the aid of the conversion table D, thereby to form the configuration data of the remainder of the workpiece 8. In the flow chart, the term "investigation block" is intended to mean a block to be checked in the edge-corrected configuration data block train B. In the start of the second step, the first block $P_0$ is selected as the investigation block (Step 35), and then the next block is selected; that is, the investigation is started with the block $Q_1$ (Step 36). It is determined whether or not the block has been investigated (Step 37). If not, it is determined from the flag set in the mode part of the block (indicated by the mark (*) beside the block $Q_1$ or $Q_2$ in the edge-corrected configuration data block train B) whether or not the block is a correction data block (Step 38). If it is not a correction data block, then Step 36 is effected again. If it is a correction data block, the start point $p_0$ of the section of the remainder is obtained from the preceding block $P_0$ (Step 39), and the address of the storage data block $P_1$ is taken out according to the pointer part 19 of the conversion table having the number (0) corresponding to the number (0) of the index part of the correction data block $Q_1$, and the block following the storage data block $P_1$ which corresponds to the numerical value (2) of the number part 20 of the conversion table (0) mentioned above is also taken out. In this case, the numerical value of the number part 19 of the conversion table 17 is two (2), and therefore the blocks $P_1$ and $P_2$ of the storage data block train C are taken out (Step 40). The coordinate data of the storage data block $P_2$; i.e., the coordinate data of the last block of the remainder configuration are replaced by those of the correction data block $Q_1$ (Step 41), the remainder's configuration data are calculated by using the data blocks $P_0$, $P_1$, $P_2$ and $Q_1$ (Step 42), and Step 36 is effected again. The above-described operations is carried out until the investigation comes to the end.

Thus, the configuration data of all the remainders created in the workpiece 8 by the edge correction have been formed. Therefore, the CNC lathe uses the above-described remainder configuration data to automatically form cutting paths for the cutting tool 11, and machines the remainder or remainders created in the workpiece 8. The configuration data of the remainder are displayed on the CRT 5, so that the configuration of the remainder can be observed before machining of the workpiece.

In the above-described first embodiment, the technical concept of the invention is applied to a CNC lathe; however, it should be noted that the invention is not limited thereto or thereby. That is, the technical concept of the invention is equally applicable to a machine tool such as a planing machine in which a cutting tool is moved relative to the workpiece to machine the latter so that, similarly, the remainder configuration data are formed, the remainder is automatically machined, and the remainder configuration data are displayed.

Figure 10:
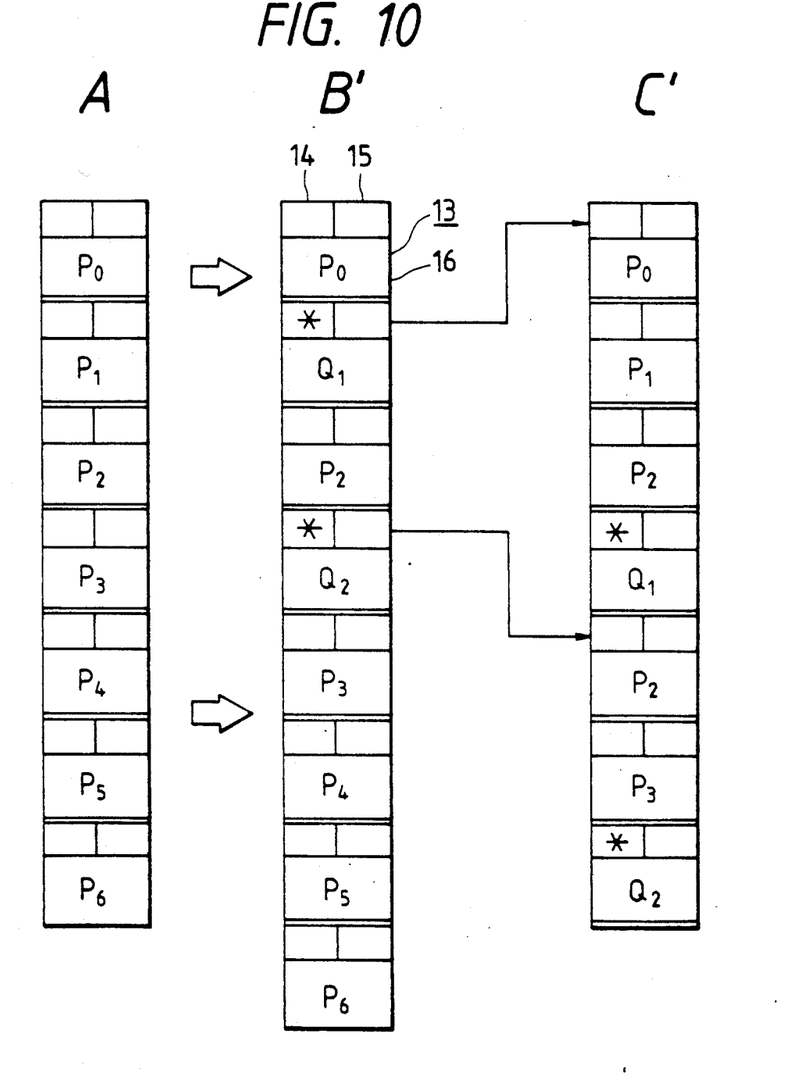
FIG. 10 is an explanatory diagram showing the relationships among a final configuration data block train, an edge-corrected configuration data train and a remainder configuration data block train, which are necessary for formation of the remainder configuration data in a second embodiment of the present invention.

A second embodiment of the present invention will be described with reference to FIGS. 10 to 13. FIG. 10 is an explanatory diagram showing the relationship among a final configuration data block train, an edge-corrected configuration data train and a remainder configuration data block train, which are necessary for formation of remainder configuration data in the second embodiment of the present invention.

In FIG. 10, reference character C' designates a remainder data block train storing all the data blocks which are required for formation of remainder configuration data and the same reference characters designate the same data in FIG. 4. The remainder data block train stores the correction data blocks $Q_1$ and $Q_2$ in the edge-corrected configuration data block train B', a pair of data blocks in the final configuration data block train A which are the same as the preceding and following data block thereof, and all the data blocks between the pair of data blocks. For instance in FIG. 5A, the remainder data block train stores the data blocks $P_0$, $P_1$, $P_2$ and $Q_1$ with respect to the first correction object, and the data blocks $P_2$, $P_3$ and $Q_2$ with respect to the second correction object. The data block trains A, B' and C' are stored in the memory 3. The structure of each data block train are shown in FIG. 10. A procedure of forming the configuration data of the remainder of the workpiece 8 in the second embodiment will be described. The remainder of the workpiece 8 is the difference between the final configuration of the workpiece 8 shown in FIG. 5B and the edge correct configuration shown in FIG. 5C. In this example, as shown in FIG. 5A, a first annular remainder $p_0$-$q_1$-$p_1$ triangular in section and a second annular remainder $p_2$-$q_2$ arcuate in section are formed. The configuration data of the first remainder are formed by using the data of the correction data block $Q_1$ of the edge-corrected configuration data block train B' and the preceding and following data blocks $P_0$ and $P_2$, and the data of the data block $P_1$ of the final configuration data block train A. That is, the block $P_0$ has the start point coordinates $p_0$ of the section, the block $P_1$ the coordinates $p_1$ and the configuration data of a straight line $p_0$-$p_1$ (perpendicular to the axis of rotation), the block $P_2$ the configuration data of a straight line $p_1$-$p_2$ (parallel to the axis of rotation), and the block $Q_1$ the coordinates $q_1$ and the configuration data of a straight line $p_0$-$q_1$ (the angle of inclination $\alpha$). These data are used to calculate the configuration data of the first remainder. Similarly, the configuration data of the second remainder are formed by using the data of the correction data block $Q_2$ and the preceding and following blocks $P_2$ and $P_3$. That is, the block $P_2$ has the start point coordinates $p_2$ of the section, the block $P_3$ the configuration data of arc $p_2 p_3$ (the radius and the center's coordinates), and the block $Q_2$ the coordinates $q_2$ and the configuration data of a straight line $p_2$-$q_2$ (the angle of inclination α). These data are used to calculate the configuration data of the second remainder.

The first step of forming the configuration data of the remainder is as follows: In formation of the edge-corrected configuration data block train B', the data blocks corresponding to the correction objects in the final configuration data block train A—for instance, with respect to the first remainder the correction data block $Q_1$ and the blocks $P_0$, $p_1$ and $P_2$ corresponding thereto, and with respect to the second remainder the correction data block $Q_2$ and the blocks $P_2$ and $P_3$ corresponding thereto—are stored with the remainder data block train C formed separately.

The second step thereof is as follows: The remainder data block train C' is accessed beginning with the first block, and as for the first remainder the data of all the data blocks $P_1$, $P_1$, $P_2$ and $Q_1$ are read until appearance of the correction data block $Q_1$ the presence of which can be confirmed, and as for the second remainder the data of all the data blocks $P_2$, $P_3$ and $Q_2$ are read until appearance of the correction data block $Q_2$ the presence of which can be confirmed, so that the configuration data of the first and second remainders are formed.

Figure 11:
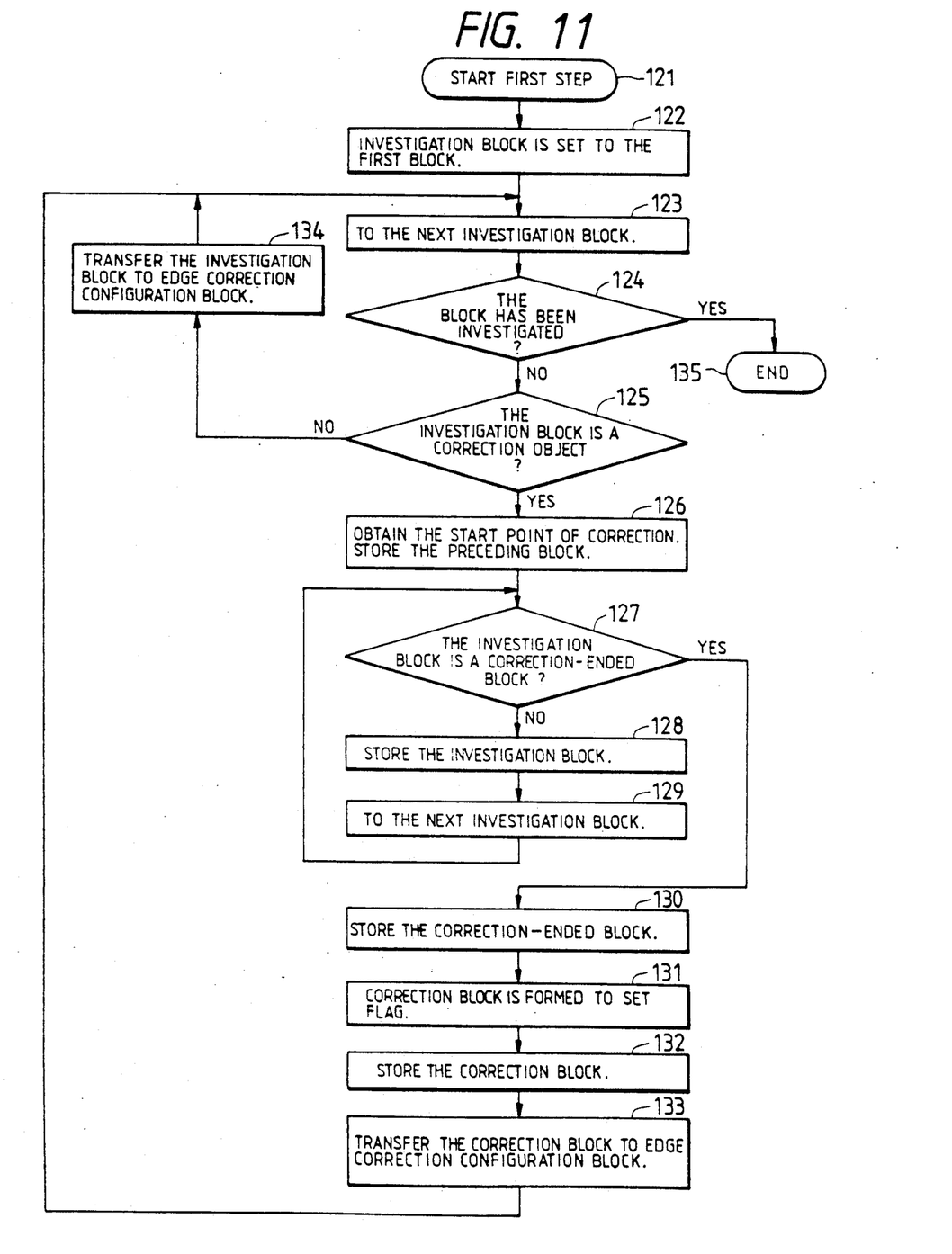
FIGS. 11 and 12 are flowchart for the second embodiment of the present invention.

FIG. 11 is a flow chart of the above-described first step. In formation of the edge-corrected configuration data block train B', the final configuration data block train A is searched for a correction object, and the correction data block and the remainder data block train C' are formed. In the flow chart, the term "investigation block" is intended to mean a block $P_n$ to be checked in the final configuration data block train A. In the start of the first step, the investigation block is set to the first block $P_0$ (Step 122), and then to the next block so that, in practice, the investigation is started with the block $P_1$ (Step 123). It is determined whether or not the block has been investigated (Step 124). If not, it is determined whether or not the investigation block is a correction object (Step 125). This determination is achieved through comparison of the gradient $a_n$ of a straight line connecting the coordinates $P_n(x_n, z_n)$ of the investigation block $P_n$ and the coordinates $p_{n-1}(X_{n-1}, z_{n-1})$ of the preceding block $P_{n-1}$ with the tool angle α of the cutting tool 11. When $a_n$ equals a, it is determined that the investigation block is a correction object. When it is determined that the investigation block is not a correction object, the investigation block $P_1 (=P_n)$; i.e., the final configuration data block is transferred to the edge-corrected configuration data block trains B' (Step 134), and Step 123 is effected again. When it is determined that the investigation block is a correction object, the coordinate data determining the correction start point is obtained from the preceding block $P_0 (=P_{n-1})$, and the block $P_0$ is stored by transferring it to the remainder data block train C' (Step 126). Next, it is determined whether or not the investigation block is a correction-ended block (Step 127). If not, the investigation block $P_1$ is also stored in the remainder data block train (Step 128), the investigation block is set to the next block $P_2$ (Step 129), and Step 127 is effected again. It is determined again whether or not the investigation block is a correction-ended block. In this case, the block $P_2$, being a correction-ended block, is stored by transferring it to the remainder data block train C' (Step 130), and a correction data block $Q_1$ is formed according to the data blocks $P_0$ through $P_2$. And the n-th bit of the mode part of the correction data block $Q_1$ is set to "1" (ON), thereby to set the flat (Step 131). The correction data block $Q_1$ is also stored by transferring it to the remainder data block train C'. In the remainder data block train C' of FIG. 10, the flag set up is indicated by (X).

Next, the correction data block $Q_1$ is transferred also to the edge-corrected configuration data block train B' (Step 133), and Step 23 is effected again. The above-described operations are carried out until the investigation block reaches the last stage. As was described above, in Step 127, it is determined whether or not the investigation block is a correction-ended block; that is, it is determined whether the coordinate point of the position data included by the block is on one side of the straight line whose gradient is equal to the tool angle α of the cutting tool 11 or the other side. When, in the FIG. 5A, the coordinate point is on the left side of the straight line, it is determined that the investigation block is a correction-ended block.

Figure 12:
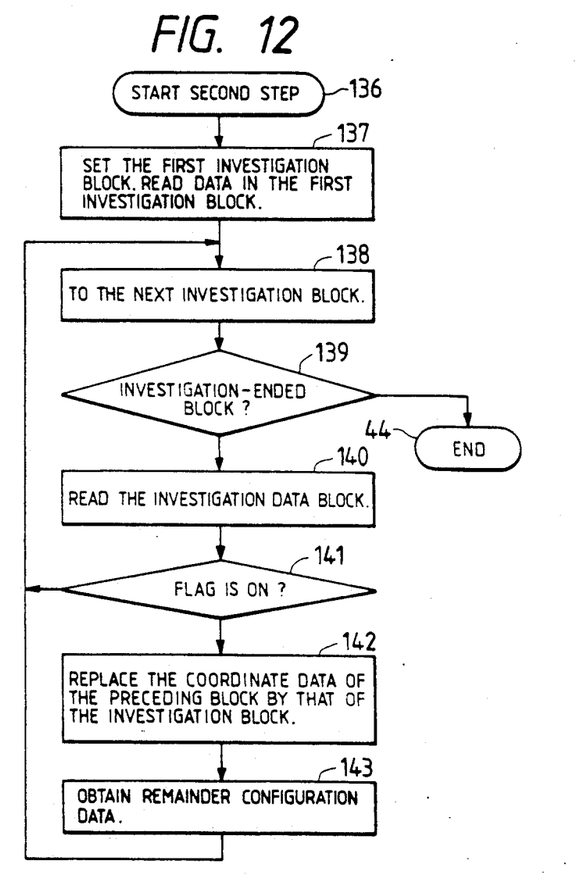

FIG. 12 is a flow chart showing the second step described above. The remainder configuration data block train C' is searched block by block so that, with the flag (X) of the correction data block $Q_1$ as an index, access is made to the data blocks $P_0$ through $Q_1$, thereby to form configuration data for the remainder created in the workpiece 8. In the flow chart, the term "investigation block" is intended to mean a block to be checked in the remainder data block train C'. In the start of the second step, the investigation block is set to the first block $P_0$, and the data of the block $P_0$ is read (Step 137). Then, the investigation block is set to the next block (Step 138), so that it is determined whether or not the block is an investigation-ended block (Step 129). If not, the data of the investigation block is read (Step 140) and the flag of the investigation block is detected (Step 141). If no flag is set up, Step 138 is effected again; that is, Steps 138 through 141 described above are carried out again. If the flag has been set up, then the investigation block is the correction data block $Q_1$; that is, the data of all the data block $P_0$ through $P_2$ and $Q_1$ for the first remainder have been read, the coordinate data of the data block $P_2$; i.e., those of the correction-ended block are replaced by those of the above-described correction data block $Q_1$ (Step 142), configuration data are calculated from the above-described data for the first remainder (Step 143), and Step 138 is effected again. The above-described operations are carried out until the investigation comes to the end.

Figure 13:
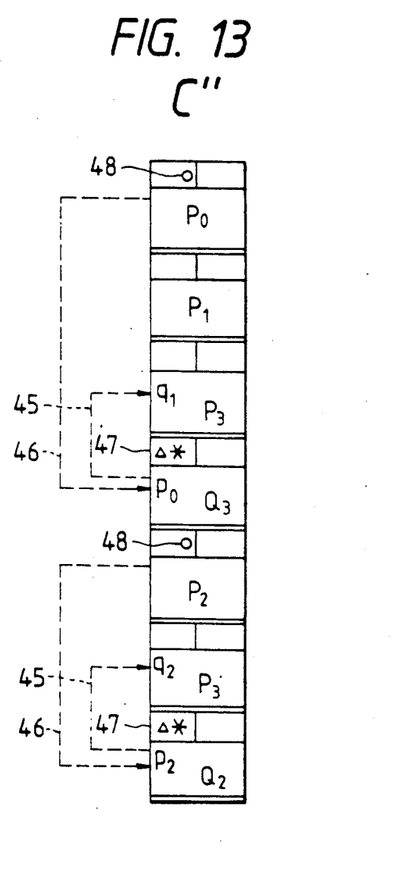
FIG. 13 is an explanatory diagram of another embodiment for preparing the remainder configuration data block train.

In the above-described embodiment, in the second step the remainder data block train C' is accessed block by block, and the remainder's data are calculated according to the data obtained through the access. A method in which, in the first step, the remainder data block train C' is made more complete so that when, in the second step, access is made to the remainder data block train C', configuration data can be immediately obtained for the remainder will be described, as another embodiment of the invention, with reference to FIG. 13. After the correction block $Q_1$ or $Q_2$ has been transferred to the edge-corrected configuration data block train B' as shown in the flow chart of FIG. 11 (Step 133), the coordinate data of the correction data block is transferred to the coordinate data part of the preceding correction and point data block as shown in FIG. 13 (Step 145). For instance, as for the first remainder, the coordinate data $q_1$ of the block $Q_1$ is transferred to the coordinate data part of the block $P_2$; and for the second remainder, the coordinate data $Q_2$ of the block $Q_2$ is transferred to the coordinate data part of the block $P_3$. As a result, the original coordinate data $P_2$ and $P_3$ of the blocks $P_2$ and $P_3$ are eliminated. Next, the coordinate data of the first data block of each of the remainders is transferred to the coordinate data part of the last correction data block (Step 146). For instance, as for the first remainder, the coordinate data $P_0$ of the block $P_0$ is transferred to the coordinate data part of the block $Q_1$; and for the second remainder, the coordinate data $P_2$ of the block $P_2$ is transferred to the coordinate data part of the block $Q_2$.

Next, the most significant bit in the mode part 14 of the last data block of each of the remainders is set to "1"; that is, a completion flag indicating the last block of the data block train for each of the remainders is set up (Step 147). For instance, the most significant bit in the mode 14 of each of the blocks $Q_1$ and $Q_2$ is set to "1". In FIG. 13, the results of execution of Step 147 are indicated by ($\Delta$). And the two least significant bits in the mode part of the first data block for each of the remainders are set to "0 0", thus indicating that that data block is the first data block including the start point coordinates of the remainder (Step 148). This will be described concretely. The two least significant bits in the mode part of the first data block $P_0$ for the first remainder are originally "0 0", and therefore Step 148 may be omitted for the first remainder. On the other hand, as for the second remainder, the two least significant bits in the mode part of the first data block $P_2$ are "0 1", and therefore they are rewritten into "0 0". In FIG. 13, the results of execution are indicated by (0).

Thus, the coordinate data indicating the coordinate point $q_1$, and the configuration data of the straight line connecting the coordinate point $q_1$ and the preceding coordinate point $p_1$ are stored in the data block $P_2$ of the first remainder, and the coordinate data of the end point $P_0$ which is equal to that of the start point $P_0$ of the block $P_0$; and the configuration data of the straight line connecting the point $P_0$ and the preceding coordinate point $q_1$ are stored in the data block $Q_1$. Similarly, the coordinate data indicating the coordinate point $q_2$ and the configuration data of the straight line connecting the coordinate point $q_2$ and the preceding coordinate point $p_2$ are stored in the data block $P_3$ of the second remainder; and the coordinate data of the end point $p_2$ which is the same as that of the start point $p_2$ of the block $P_2$, and the configuration data of the straight line connecting the point $p_2$ and the preceding coordinate point $q_2$ are stored. In the remainder data block train $C'$, the first block of the data block train for each of the remainders can be detected from the fact that the two least significant bits in the mode part 14 of the block are "0 0", and the last block can be detected from the completion flag in the mode part thereof. The coordinate data of the first and last blocks; i.e., a close loop that the start and end points of the section of each remainder coincide with each other is displayed. Therefore, access made to the remainder data block train $C'$ block by block beginning with the first data block in the second step can form configuration data for each remainder without execution of Steps 142 and 143 in FIG. 12.

As was described above, in any one of the above-described embodiments, configuration data are formed for all the remainders which are created in the workpiece 8 because of the edge correction. Therefore, the CNC lathe utilizes the remainder configuration data to automatically form machining paths for the cutting tool 11, thereby to machine the remainders created in the workpiece 8. The remainder configuration data are displayed on the CRT 5, so that they can be confirmed before machining of the workpiece.

In the above-described embodiments, the technical concept of the invention is applied to a CNC lathe; however, it should be noted that the invention is not limited thereto or thereby. That is, the technical concept of the invention is equally applicable to a machine tool such as a planning machine in which a cutting tool is moved relative to the workpiece to machine the latter so that, similarly, the remainder configuration data are formed, the remainder is automatically machined, and the remainder configuration data are displayed.

As was described above, according to the invention, the configuration data of a remainder created in the workpiece because of the edge configuration of the cutting tool are automatically formed, which eliminates the difficulty that the configuration data of the remainder must be separately calculated and inputted in order to remove the remainder.

What is claimed is:

1. A method of forming configuration data for a computerized numerical control (CNC) machine having a CNC unit comprising a central processing unit (CPU), a memory, input/output means, servo drive means and a cutting tool driven by the drive means, comprising:

(a) inputting to said CNC unit first data related to a final workpiece configuration and second data representing the edge configuration of said cutting tool;

(b) forming by said CNC unit on the basis of said first data a first data block train for a final workpiece configuration;

(c) forming by said CNC unit on the basis of said first data block train and said second data a second data block train comprising edge-corrected configuration data; and (d) forming from said second data block train and said first data block train remainder data defining a remainder which is created in said workpiece because of the edge configuration correction.

2. The method of claim 1, further comprising:

forming correction data for a portion of the workpiece requiring edge configuration correction;

adding said correction data to said second data block train;

forming a third data block train comprising said remainder data, said train being formed by storing said final configuration data and said correction data; and forming configuration data for the remainder using said third data block train.

3. The method of claim 2, further comprising:

forming a fourth data block train comprising a conversion table for identifying correction data added to said second train, and stored in storage locations in said third data block train as related final configuration data and correction data.

4. The method of claim 2 wherein a plurality of remainders are defined by said third data block train.

5. The method of claim 2 wherein said third data block train comprises correction data blocks and print data blocks, said method further comprising:

transferring the coordinate data of one data block to the coordinate data part of other correction and print data blocks in said train, whereby configuration data can be immediately obtained for a remainder.

6. A method of forming configuration data for a computerized numerical control (CNC) machine having a CNC unit, comprising a central processing unit (CPU), a memory, input/output means, servo drive means and a cutting tool driven by the servo drive means, and operative to automatically cut a workpiece into a final configuration, defined by final configuration data inputted for the workpiece, according to an edge-corrected configuration data block train formed by the edge configuration of a cutting tool taken into account, the improvement comprising:

forming a correction data block having index data, for a correction object;

adding said correction block to said edge-corrected configuration block train;

forming a storage data block for storing said final configuration data corresponding to said correction object;

forming a conversion table for searching for the address of said storage data block on the basis of said index data;

extracting data of said correction data block from said edge-corrected configuration data block;

extracting said storage data block corresponding to said correction object obtained using said conversion table; and forming configuration data for a remainder which is created in said workpiece because of the edge configuration conversion.

* * * * *